US009383991B2

(12) United States Patent
Anand et al.

(10) Patent No.: US 9,383,991 B2
(45) Date of Patent: Jul. 5, 2016

(54) AUTOMATION IN IT SERVICES AND IT ENABLED SERVICES

(75) Inventors: Kumar Anand, Hyderabad (IN); Nori Kesav Vithal, Hyderabad (IN); Reddy Nitin Kunda, Hyderabad (IN)

(73) Assignee: TATA CONSULTANCY SERVICES LTD., Hyderabad (IN)

( * ) Notice: Subject to any disclaimer, the term of this patent is extended or adjusted under 35 U.S.C. 154(b) by 1002 days.

(21) Appl. No.: 12/490,658

(22) Filed: Jun. 24, 2009

(65) Prior Publication Data

US 2010/0070952 A1 Mar. 18, 2010

(30) Foreign Application Priority Data

Jun. 24, 2008 (IN) .......................... 1312/MUM/2008

(51) Int. Cl.
*G06F 9/44* (2006.01)
*G06F 7/00* (2006.01)

(52) U.S. Cl.
CPC ....................................... *G06F 8/68* (2013.01)

(58) Field of Classification Search
CPC ... G06F 8/20; G06F 8/60; G06F 2009/45575; G06Q 10/10; G06Q 10/101
See application file for complete search history.

(56) References Cited

U.S. PATENT DOCUMENTS

| | | | | |
|---|---|---|---|---|
| 2002/0038454 A1* | 3/2002 | Trux | .............................. | 717/159 |
| 2004/0128400 A1* | 7/2004 | Srinivasan et al. | ............ | 709/250 |
| 2007/0226241 A1* | 9/2007 | Ng et al. | ........................ | 707/102 |
| 2008/0250385 A1* | 10/2008 | Sanchez | ........................ | 717/100 |
| 2009/0119584 A1* | 5/2009 | Herbst | .......................... | 715/273 |
| 2009/0132309 A1* | 5/2009 | Marin | ............................... | 705/7 |

OTHER PUBLICATIONS

About Siebel eScript, 2007, Oracle.*
Stephen Ferg, Notes on How Parsers and Compilers Work, Oct. 10, 2007, http://parsingintro.sourceforge.net/.*

* cited by examiner

*Primary Examiner* — Hyun Nam
(74) *Attorney, Agent, or Firm* — Robert Plotkin, P.C.; Robert Plotkin

(57) ABSTRACT

A system for automation of processes in a working environment to achieve targeted deliverables, said system comprising: mapping means adapted to map discrete processes in a working environment; reader means adapted to read human instructions in relation to targeted deliverables at mapped discrete processes; interpreter means adapted to interpret said read instructions into a machine readable instruction format; compiler means adapted to compile said machine readable instruction format into a pre-defined operating system executable instruction format; packager means adapted to classify and package said operating system executable instruction format in a pre-defined format; and installer means adapted to install and deploy said packaged format in said working environment to complete the automation process and achieve targeted deliverables.

4 Claims, 4 Drawing Sheets

AUTOMATION IN IT SERVICES AND IT ENABLED SERVICES

FIELD OF INVENTION

This invention relates to the automation in IT services and IT enabled services.

This invention also relates to maintaining information integrity and reducing information fragmentation in organizations introduced by IT systems.

This invention also relates to automating IT tasks introduced by IT systems.

BACKGROUND OF INVENTION

Information systems have important strategic impact on global business which is profound in variety of Industrial sectors like retail, manufacturing, services, healthcare, insurance, telecom and government. Organizations in these sectors are supported by islands of information systems made up of new and old, compatible and not-so-compatible software providing functionality in some identified and chosen aspect of business. Each system internally house-keep transactions, support processes and host business decisions to realize the functionality. They provide a platform that enable organizations to integrate and coordinate their business processes and ensure that information is shared across all functional levels and management hierarchies in the organization. As businesses evolve, business plans are constructed and business decisions made to move from the current business to the target business. These plans and decisions are propagated to the organization's information systems so that corresponding transactions and processes can be supported.

There are three primary segments in each of these sectors by customer size: Enterprises, Mid-Market and Small Companies. Statistics show that there are more than 200-300 Enterprise information systems (SAP, J D Edwards, Peoplesoft, IBM, Oracle) for Performance, Finance and Accounting, Human Resource, Supply Chain, Payroll, Banking, Insurance, Customer, Enterprise Resource, Telecom, Travel amounts in every medium to enterprise companies. Statistics also show that there are huge disconnects in maintaining information integrity and information fragments exist in Enterprise and Mid-Market companies. Currently manual labor is involved in maintaining information integrity and reducing information fragmentation.

OBJECT OF INVENTION

The object of this invention is to provide a tool for automation of IT services and IT enabled services.

The object of this invention is to maintain information integrity and reduce information fragmentation in organizations introduced by IT systems.

Another object of this invention is to provide a tool which increases the accuracy of the transactions carried out by organizations using IT services and IT enabled services.

Another object of this invention is to provide a tool which increases the efficiency of IT services.

Still one more object of this invention is to provide a tool which reduces hardware burden imposed by the different manual processes.

Yet another object of this invention is to provide a tool which reduces the manual work load of the employees.

Another object of this invention is to reduce the expenditure and increase the profit on IT usage to the organizations.

Another object of this invention is to increase the productivity of business users using their IT systems.

Still another object of this invention is to provide a tool which is easy to use and cost effective. Another object of this invention is to provide an IT robot for automating IT tasks in IT systems.

SUMMARY OF INVENTION

According to this invention, there is provided an automated tool (E-Script) adapted to perform tasks and services in relation to Information Technology (IT) processes.

For the purposes of this specification, a working environment includes a setup where various processes are collated to complete a product or a process, typically from its inception to its modification, to its production. Each process is typically a component adapted for performing customized pre-defined tasks.

E-Script is an IT robot that emulates human activities in a computer. It performs tasks that are simple and repetitive at a higher rate with high endurance, reliability, precision and speed. The tasks that E-Script performs are organized for integration, repeatability and scalability. E-Script manipulates and interacts with IT systems to facilitate this automation and supports a comprehensive environment for task definition and enactment, making use of many tools in a coordinated manner so that integration of information systems is supported through automation.

According to this invention, there is provided a system for automation of processes in a working environment to achieve targeted deliverables, said system comprises:
  mapping means adapted to map discrete processes in a working environment;
  reader means adapted to read human instructions in relation to targeted deliverables at mapped discrete processes;
  interpreter means adapted to interpret said read instructions into a machine readable instruction format;
  compiler means adapted to compile said machine readable instruction format into a pre-defined operating system executable instruction format,
  packager means adapted to classify and package said operating system executable instruction format in a pre-defined format; and
  installer means adapted to install and deploy said packaged format in said working environment to complete the automation process and achieve targeted deliverables.

E-Script Tool Comprises,
  Process development environment;
  Process notation;
  Process interpreter;
  Process compiler;
  Process packager;
  Process run-time; and
  Installer to deploy the compiled tool in the target machine.
E-Script Tool can be deployed in the following scenarios:
  E-Script can be used in organizations to integrate financial information—To avoid receiving conflicting information from Finance, HR or Manufacturing Department.
  E-Script can be used in organizations to integrate customer order information—To maintain integrity in status of customer order across various divisions and subsidiaries.
  E-Script can be used to standardize and speed up manual IT processes—E-Script can save time, increase productivity and reduce head count.

E-Script can help business process flow more smoothly, and improve information integrity across the organization.

E-Script can be used to standardize information—Especially in companies with multiple business units, divisions and subsidiaries.

E-Script can be used to reduce business latency—percolation of business decisions into supporting IT systems.

DESCRIPTION OF THE INVENTION

Information systems are designed to support the functionality needed by business units so that they can meet their responsibilities. When business units are mature enough, they procure and/or home-grow and adopt the best in class information system solution available in the market. (Example: Systems like ERP, SCM and CRM cater to different functional needs of business units but not to business as a whole).

Ideally, information systems should form the backbone of information flow within the organization and provide platforms that enable organizations to integrate and coordinate their business processes to ensure that information is shared across all functional levels and management hierarchies. However, because of the diversity of information systems procured over a period of time by different business units, there exist less connectivity and information structuring between these systems. (For example, consider the case of parent company using SAP to support their processes and its subsidiary using Oracle.)

It is not hard to see that there could be duplication of data, and other kinds of overlaps between these systems. It is also possible that data in one system is needed by transactions in other system. Also, presence of variety of information systems and corresponding information structures introduces inconsistency in information shared across business units, functional levels and management hierarchies of the organization. Such a situation is ripe for loss of integrity of these systems due to lack of consistency between them in relation to the organization. In such situations, maintaining integrity across systems requires a disciplined usage of systems, often requiring a role-playing user to login into multiple systems and carefully use them to assure integrity. This crossover between systems is manual, tedious and prone to error and the knowledge of crossover is implicit to the users of the information systems.

We introduce automation as a means to reduce/remove human efforts impended in maintaining information integrity. Towards this end, we have designed E-Script. In E-Script, human activities that straddle across information systems are identified and automated. When all activities are completely automated, information systems are bridged by automation. Such automation increases accuracy, reduces latency, increases efficiency, improves productivity and reduces hardware burden imposed by manual processes. In short, E-Script is an IT robot that emulates human activities in a computer. It performs tasks that are simple and repetitive at a higher rate with high endurance, reliability, precision and speed. The tasks that E-Script performs are organized for integration, repeatability and scalability. E-Script manipulates and interacts with IT systems to facilitate this automation and supports a comprehensive environment for task definition and enactment, making use of many tools in a coordinated manner so that integration of information systems is supported through automation.

E-Script Tool Comprises,
  Development environment (Editor);
  Interpreter;
  Compiler;
  Packager;
  Run-time;
  Installer E-Script Interpreter:

Typically, said Interpreter Means Comprises:
  interpreter pre-processor means adapted to process input data before relaying further;
  interpreter lexer means adapted to parse said pre-processed data in a lexical manner;
  interpreter syntaxer means adapted to fit said lexical data in a syntactic manner;
  interpreter builder means adapted to build a machine readable instruction format from said syntactic data; and
  interpreter executor means adapted to execute said built machine readable instruction format.

E-Script interpreter emulates human activities written using the E-Script language. It executes the process described using the E-Script language directly and can be used during the development/design of the process description. E-Script interpreter is designed to support process automation in Windows Operating System environment. During execution, E-Script interpreter converts the source process description into an intermediate virtual machine (VM) code. The interpretation of the VM code involves accessing arguments of the activity to be performed, performing the activity and then moving on to the next activity.

E-Script interpreter comprises of the following modules: Pre-Processor, Reader, Lexer, Syntaxer, Builder and Executor. Each of these modules converts the process description into an intermediate form that is understandable by the next module. The purpose of such a conversion is to make the process description suitable for execution by the machine. The final Executor module performs the actual execution of the process.

E-Script Compiler:

Typically, said Compiler Means Comprises:
  compiler pre-processor means adapted to process input data before relaying further;
  compiler lexer means adapted to parse said pre-processed data in a lexical manner;
  compiler syntaxer means adapted to fit said lexical data in a syntactic manner;
  compiler builder means adapted to build a system executable instruction format from said syntactic data;
  compiler executor means adapted to execute said built system executable instruction format.

E-Script compiler converts the process description written using E-Script language into an executable form for the Windows Operating System Environment. The compiled executable performs the activities for the process described using the E-Script language and can be used for the automated enactment of the process description. E-Script compiler comprises of a common run-time that provides the necessary functionality for automation.

E-Script compiler comprises of the following modules: Pre-Processor, Reader, Lexer, Syntaxer, Builder and Packager. Each of these modules converts the process description into an intermediate form that is understandable by the next module. The purpose of such a conversion is to make the process description suitable for execution by the machine. The Package module links the E-Script process description with the common run-time and creates the executable that can be deployed in the target environment.

E-Script Packager:

Typically, said packager means comprises installer service component and package file means adapted to install a packaged file into a system for automating processes.

E-Script packager creates a single package of the compiled executable along with the supporting files. The packaged executable can be used to deploy and manage E-Script in the target environment. E-Script can be considered as an engine which can trigger, control and manage software (also widely called as application packages) in the target environment. It provides a standard method for customizing, installing, and updating E-Script deployments. E-Script Packager is divided into two parts that work in combination: an installer service and a package file. E-Script Installer uses the information contained within a package file to install the application.

E-Script Editor:

Typically, said system includes an editor means adapted to provide script for guiding the functioning of said processes in an automated manner.

Process definitions in E-Script can be created using the E-Script language in E-Script editor. E-Script editor provides syntax highlighting, code sense, syntax completion, call tips and error indicators using its lexer component. E-Script editor comprises of the following modules: Reader, Lexer, Highlighter and Writer.

E-Script Runtime:

Typically, said system includes a runtime means adapted to provide synchronised running of scripts for automating said processes.

E-Script runtime is a virtual machine state which provides software services for processes while enacting the user defined process but is not part of the operating system. It pertains to providing support for the operating system in executing activities defined using E-Script. E-Script runtime provides support for connecting to the Microsoft Office environment and Microsoft Windows operating system internals during process enactment.

Case Study in the BPO Sector:

Retailers like Mustafa, Wal-Mart, Staples and Home Depot sell commodities in huge numbers every day. Their IT systems house-keep inventory, sales, suppliers, customers, receivables, payables, offers, discounts, etc. To cater to growing competition in their markets, they announce discounts, provide offers and adopt similar marketing practices to improve their sales. All these decisions are percolated to their IT systems and reflected in information related to millions of commodities. There is human effort and cost involved in making this percolation. To reduce the cost involved in such manual efforts, these companies outsource the work. In the outsourced company, Data validation team identifies changes to be made, Transaction team make these changes in customers' IT systems and Quality team checks and validates the transactions. Thus, we can see that, in order to solve the customers' outsourcing problem, more IT tasks and more role-playing users are introduced.

Using E-Script, the IT activities required to perform a transaction is defined as a process program. Typical IT activities can be as low level as opening excel file, reading records from excel, accessing customers' IT systems, searching for text in internet etc. E-Script robot then poses itself as a role playing user in the customers' IT system and uses techniques like screen scrapping, scripting, hooking, journaling, etc to automatically perform the activities defined in the process program. Since the transactions are performed by the machine there is no need to verify the correctness of the transacted data, which means verification activity by the quality team can be ruled out (instead they can do random sampling), rework can be reduced significantly as E-Script supports batch processing and people can prepare the data to be transacted while E-Script performs the transactions.

The additional advantage is that E-Script can work for 24 hours a day, the data transfer is highly accurate with utmost confidentiality. Further, the maximum throughput, in few examples, may reach one hundred thousand transactions per shift per terminal. Thus E-Script helps reduce the burn out in the BPO sector, increases productivity, improves their accuracy and reduces rework and associates can be migrated to perform value adding work. This is the value that E-Script creates.

BRIEF DESCRIPTION OF ACCOMPANYING DRAWINGS

DETAILED DESCRIPTION OF ACCOMPANYING DRAWINGS

According to this invention there is provided a tool for time and cost optimization of IT services and IT enabled services. The tool in accordance with this invention proposes integration by automation as a means to bridge IT systems, leading to a possibility of completely avoiding manual intervention thereby assuring information integrity across systems. Such integration would increase accuracy, efficiency and reduce the hardware burden imposed by manual process actions. The tool is able to support a comprehensive environment, making use of many tools in a coordinated manner so that customization is supported through automation.

Figure 1:
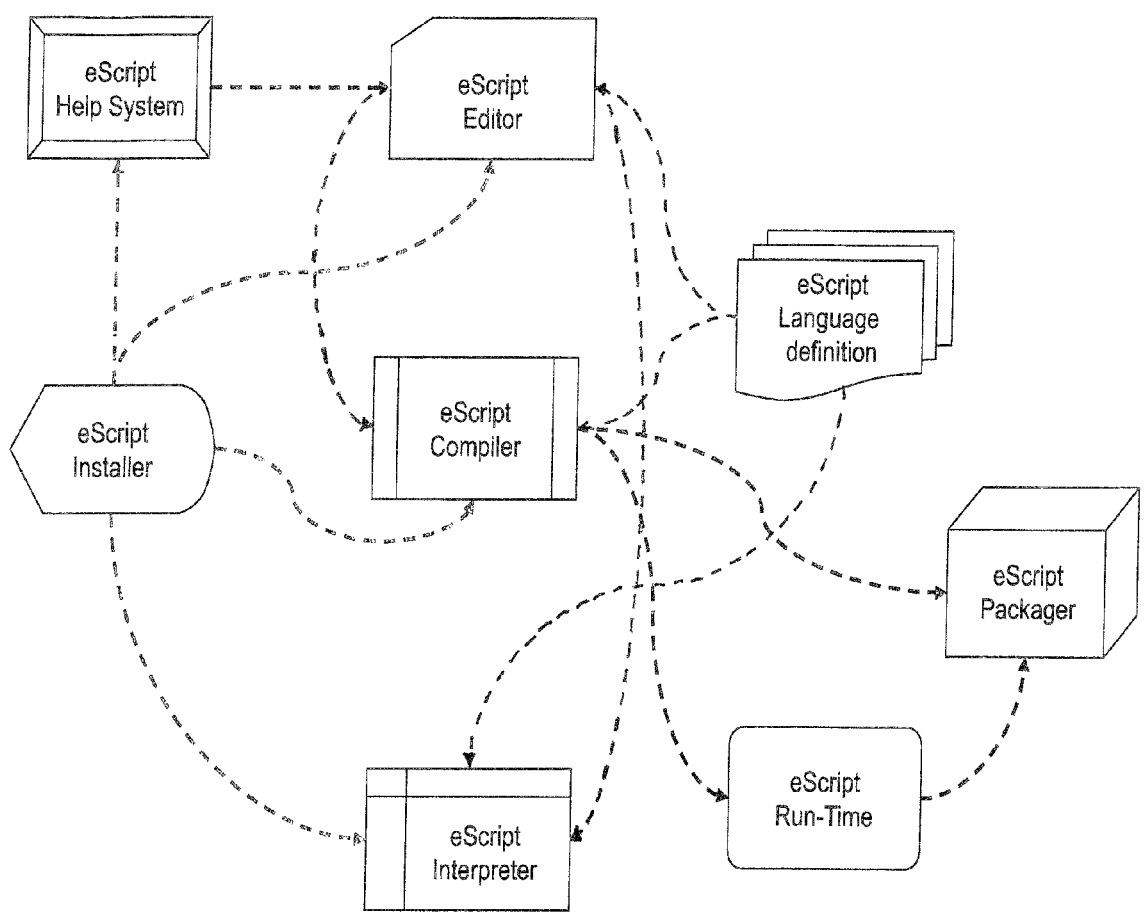
FIG. 1 illustrates a block diagram of the architecture of the tool in accordance with this invention.

FIG. 1 illustrates a block diagram of the architecture of the tool in accordance with this invention. The tool comprises, E-Script interpreter emulates human activities written using the E-Script language. It executes the process described using the E-Script language directly and can be used during the development/design of the process description.

E-Script compiler converts the process description written using E-Script language into an executable form for the Windows Operating System Environment. The compiled executable performs the activities for the process described using the E-Script language and can be used for the automated enactment of the process description. E-Script compiler comprises of a common run-time that provides the necessary functionality for automation.

E-Script packager creates a single package of the compiled executable along with the supporting files. The packaged executable can be used to deploy and manage E-Script in the target environment.

Process definitions in E-Script can be created using the E-Script language in E-Script editor. E-Script editor provides syntax highlighting, code sense, syntax completion, call tips and error indicators using its lexer component. E-Script editor comprises of the following modules: Reader, Lexer, Highlighter and Writer.

E-Script runtime is a virtual machine state which provides software services for processes while enacting the user defined process but is not part of the operating system. It pertains to providing support for the operating system in executing activities defined using E-Script. E-Script runtime provides support for connecting to the Microsoft Office environment and Microsoft Windows operating system internals during process enactment.

Figure 2:
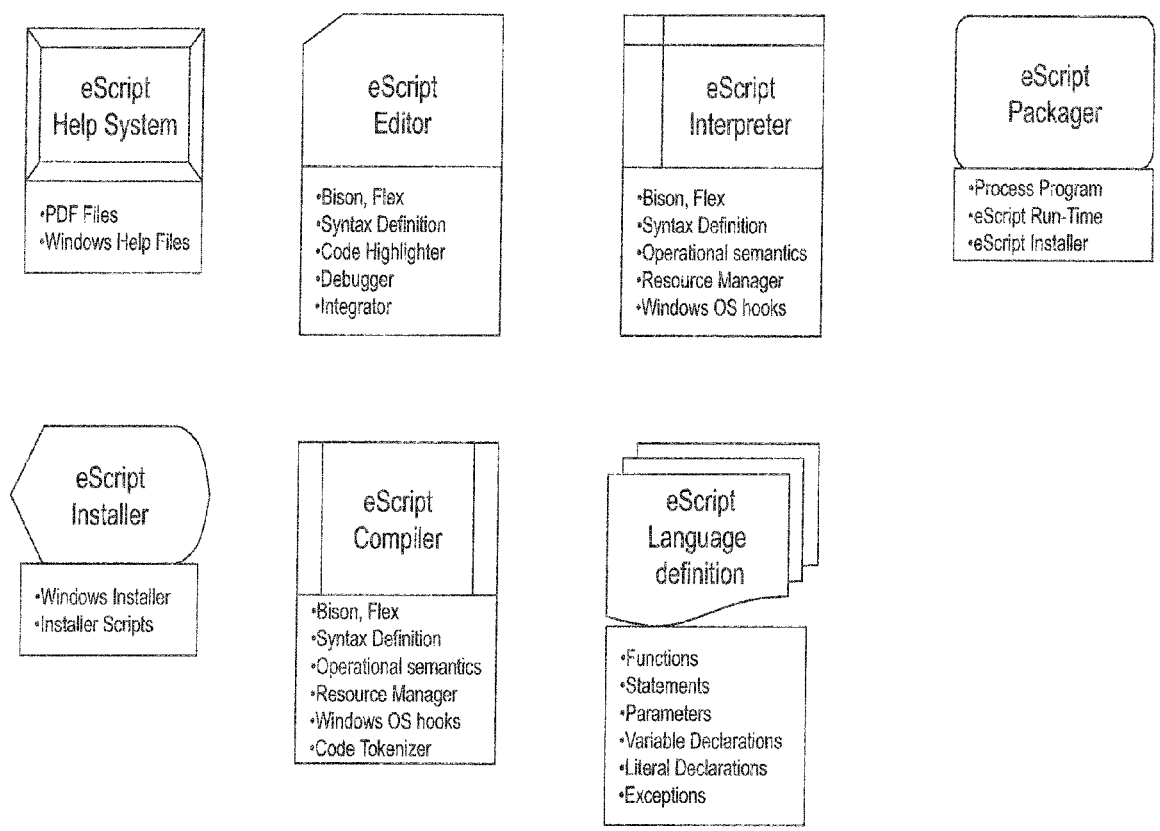
FIG. 2 illustrates a block diagram of the components of construction of the tool in accordance with this invention.

FIG. 2 of the accompanying drawings illustrates a block diagram of the components of construction of the tool in accordance with this invention.

Figure 3:
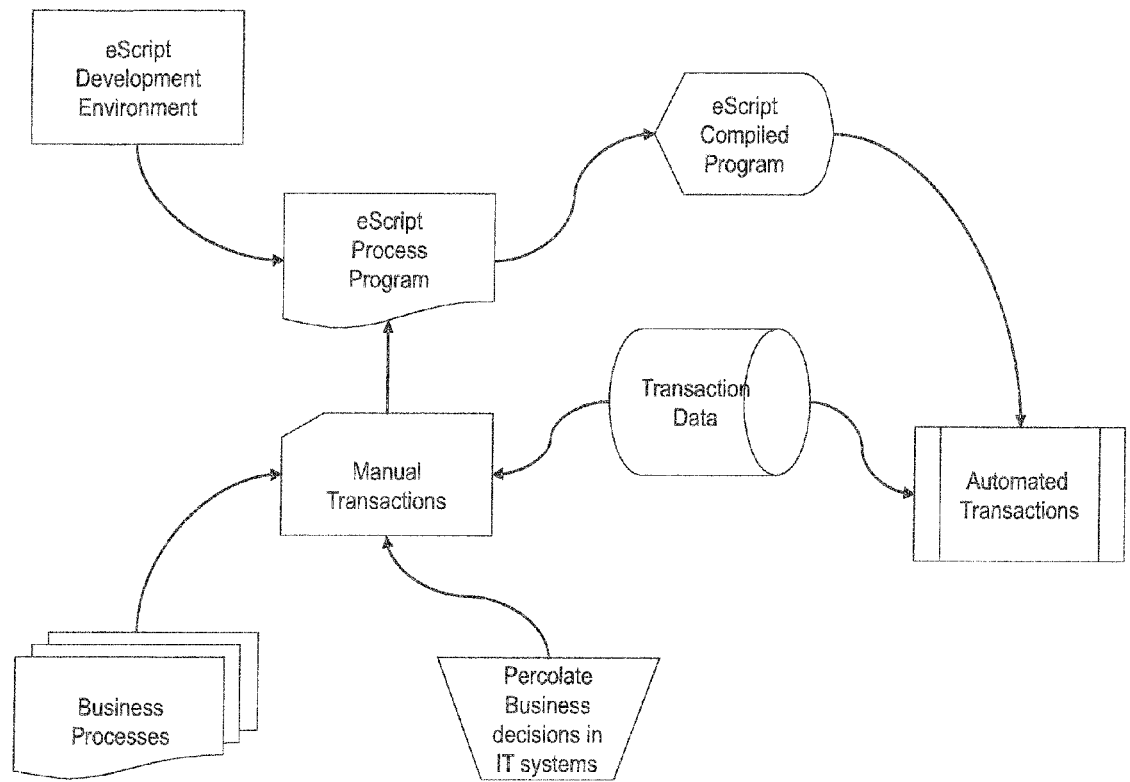
FIG. 3 is a block flow diagram illustrating the deployment of the script for automated transactions, in accordance with this invention.

FIG. 3 is a block flow diagram illustrating the deployment of the script for automated transactions, in accordance with this invention. The E-Scripts for programs required to perform various transactions are developed in E-Script development environment. The tool compiles the program and the transactions are performed on said transaction data as specified by the client.

Figure 4:
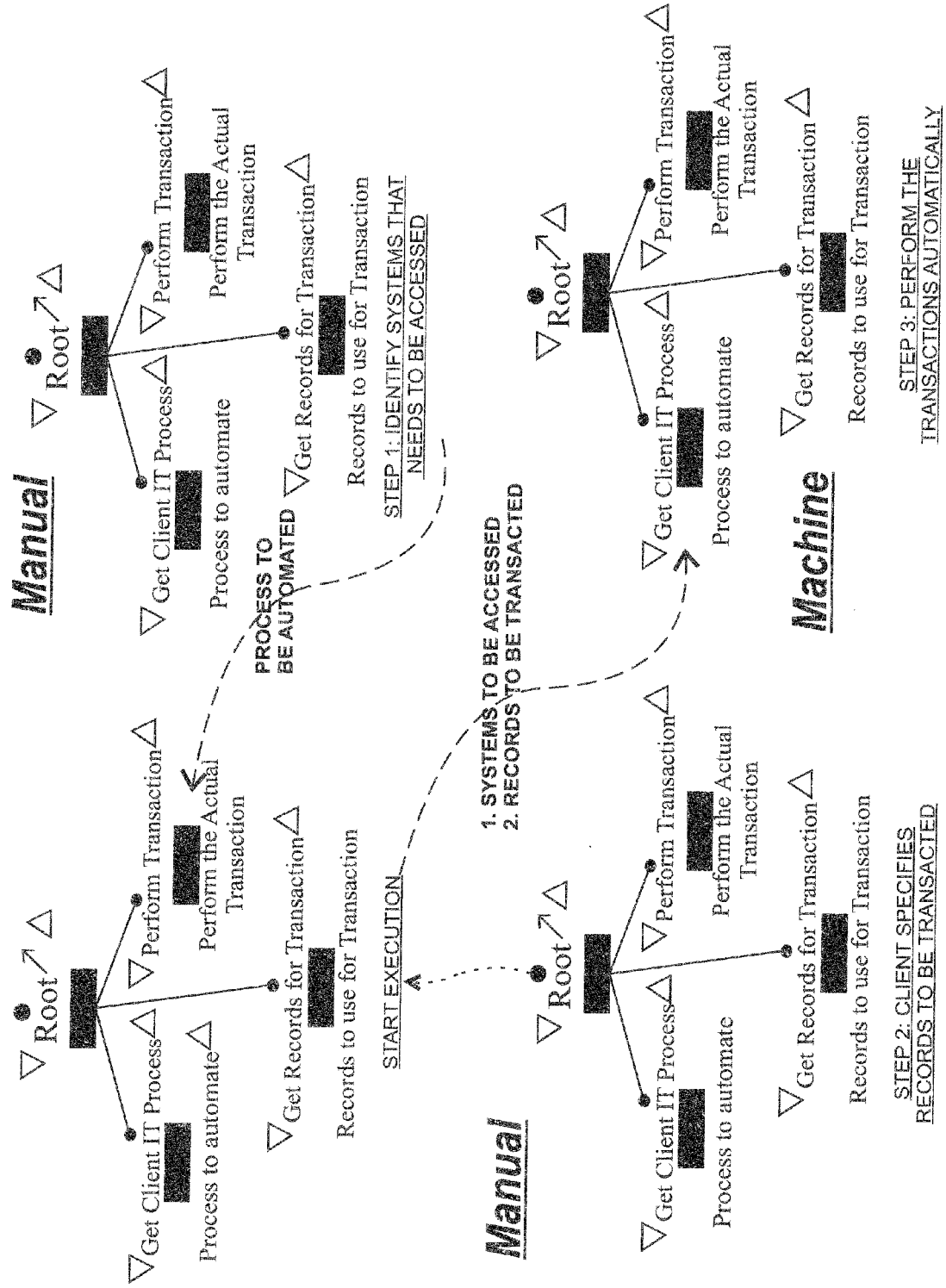
FIG. 4 is a work flow diagram illustrating the process of automated transactions, in accordance with this invention.

FIG. 4 of the accompanying drawings illustrates the process of automated transactions, in accordance with this invention.

While considerable emphasis has been placed herein on the various components of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A computer implemented system for automation of human activity transactions in a computer based working environment, said system comprising:
   a mapper to map discrete human activity transactions in said-working environment;
   an editor to provide one or more scripts for guiding functioning of said human activity transactions in an automated manner, wherein said one or more scripts manipulates and interacts with said system to facilitate the automation of said human activity transactions;
   a reader to read instructions in relation to targeted deliverables in relation to said mapped human activity transactions;
   an interpreter to interpret said read instructions into a machine operations format, wherein the interpretation of said machine operations involves accessing arguments of the transaction to be performed, performing the transaction and moving to the next transaction;
   a compiler to transform said machine operations into instructions that direct a machine to automatedly perform the human activity transactions on said machine in relation to a process program, using said one or more scripts, and wherein said compiler comprises a common run-time that facilitate the necessary functionality for automation of said human activity transactions;
   a runtime to provide synchronized running of said one or more scripts for enacting automatedly said human activity transactions, wherein said runtime is a virtual machine state that facilitates the automation of said human activity transactions;
   a packager to classify and package said instructions that direct the machine and associated supporting files into a form suitable for distribution; and
   an installer to install and deploy said classified instructions in said packaged format in said working environment to complete the automation of said human activity transactions and achieve targeted deliverables.

2. The computer implemented system as claimed in claim 1, wherein said interpreter comprises:
   an interpreter pre-processor to process said inputted read instructions before relaying further;
   an interpreter lexer to parse said pre-processed instructions in a lexical manner;
   an interpreter syntaxer to fit said parsed lexical instructions in a syntactic manner;
   an interpreter builder to build said syntactically fitted parsed lexical instructions into a machine operations format; and
   an interpreter executor to execute said built machine operations.

3. The computer implemented system as claimed in claim 1, wherein said compiler comprises:
   a compiler pre-processor to process said instructions in machine operations format before relaying further;
   a compiler lexer to parse said pre-processed machine operations in a lexical manner;
   a compiler syntaxer to fit said lexical parsed machine operations in a syntactic manner;
   a compiler builder to build syntactically fitted parsed lexical machine operations into instructions that direct a machine to automatically perform the human activity transactions in relation to a process program; and
   a compiler executor to execute said instructions that direct the machine to automatically perform the human activity transactions in relation to the process program.

4. The computer implemented system as claimed in claim 1, wherein said packager comprises an installer service component and package file to install a packaged file into said system for automating said human activity transactions.

* * * * *